Dec. 6, 1960
C. L. HODGIN
2,962,744
SHOE BRUSHING DEVICE
Filed Jan. 14, 1959
2 Sheets-Sheet 1
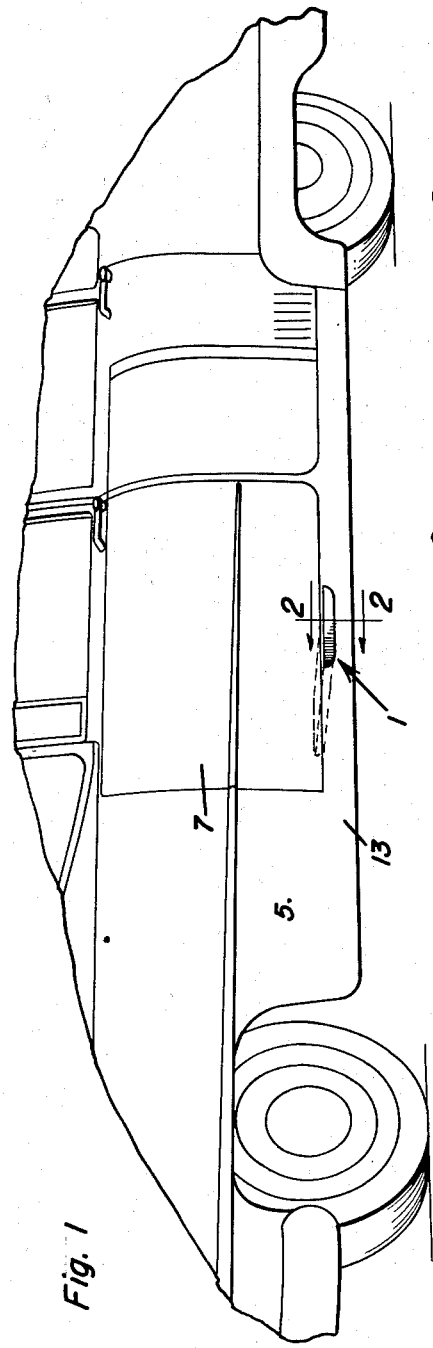
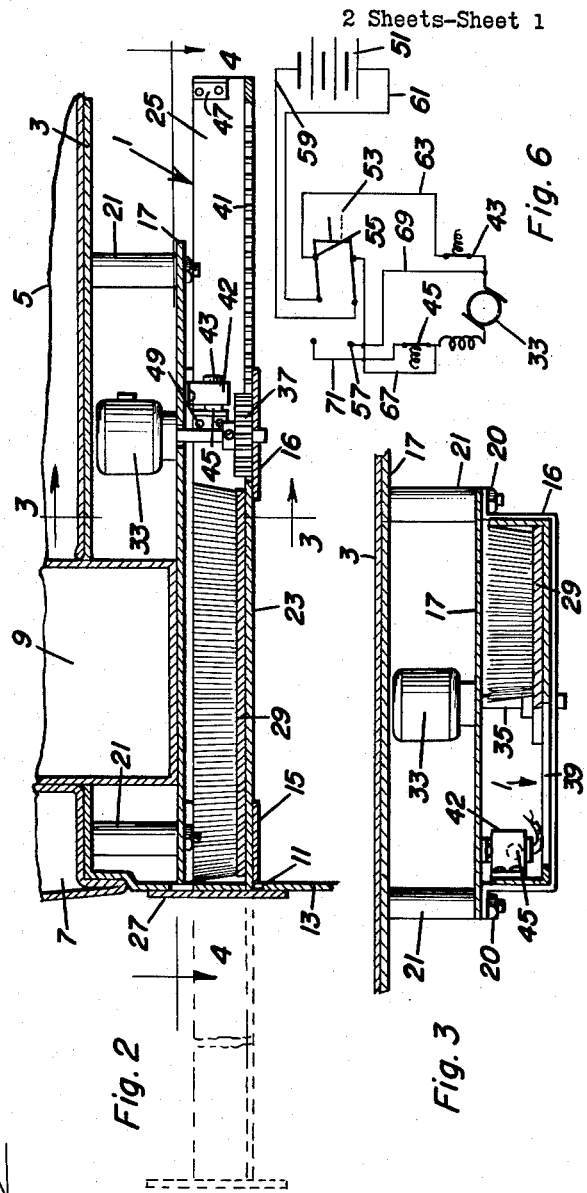
Charles L. Hodgin
INVENTOR.
BY *Clarence A. O'Brien*
*and Harvey B. Jackson*
Attorneys Dec. 6, 1960     C. L. HODGIN     2,962,744

SHOE BRUSHING DEVICE

Filed Jan. 14, 1959     2 Sheets-Sheet 2

Charles L. Hodgin

INVENTOR.

United States Patent Office 2,962,744
Patented Dec. 6, 1960

2,962,744

SHOE BRUSHING DEVICE

Charles L. Hodgin, P.O. Box 284, Carrizozo, N. Mex., assignor of fifty percent to Larry Galbreth, Albuquerque, N. Mex.

Filed Jan. 14, 1959, Ser. No. 786,838

7 Claims. (Cl. 15—161)

This invention relates to improvements in shoe brushing devices for use on automobiles.

The primary object of the invention is to provide a device for attachment to an automobile under the floor of the automobile body for advance out of one side of the body under one of the doors and retraction under the automobile floor into concealed position, and which embodies a brush device on which a person may, before entering the automobile, brush the soles and other parts of his or her shoes clean of mud, snow or dust, to obviate tracking dirt or snow on the floor mat of the automobile, or soiling the upholstery, and/or creating a dangerous driving hazard by getting mud, water or snow on the control pedals of the automobile.

Another object is to provide a device according to the foregoing which includes motor operated means for advancing and retracting the brush device adapted for control by a switch conveniently located on the automobile, preferably on the steering column.

Still another object is to provide a device for the above purposes which is of simple, inexpensive, durable construction, convenient to use, and maintain clean, and which will not materially increase the cost of an automobile to which the device is attached.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a view in side elevation of a device according to this invention attached to an automobile body;

Figure 2 is an enlarged fragmentary view in vertical section, partly in broken lines;

Figure 3 is a view in vertical cross-section taken on the line 3—3 of Figure 2;

Figure 6 is a diagrammatic view of an electric circuit and control switches for the motor.

Figure 4:
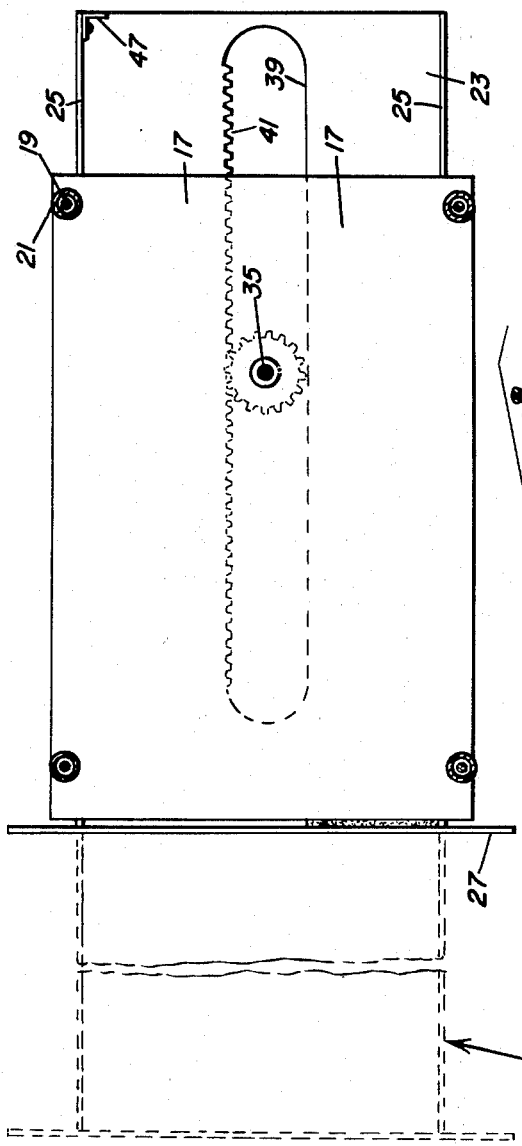
Figure 4 is an enlarged view in plan, partly in section, and partly in broken lines, taken on the line 4—4 of Figure 2.
Figure 5:
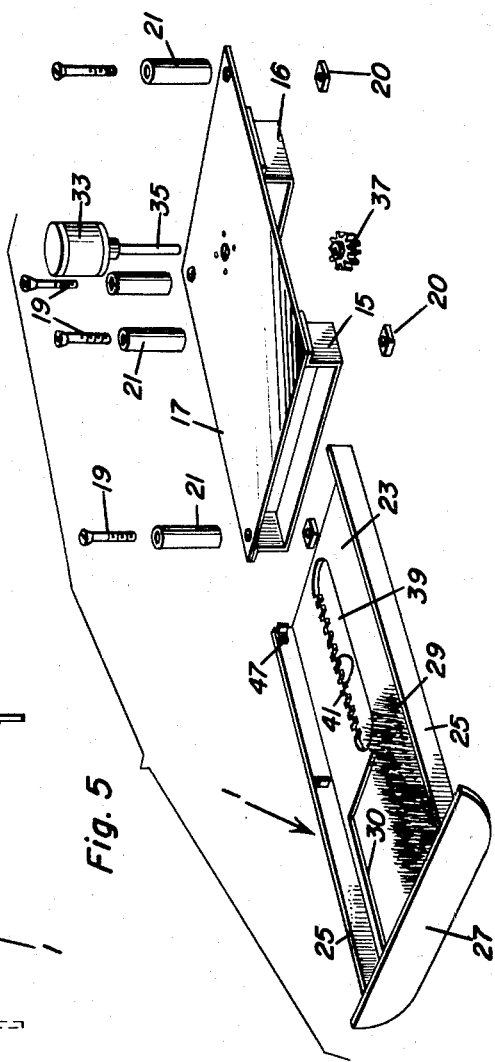
Figure 5 is an exploded view in perspective of parts of the device.

Referring to the drawings by numerals, the device of this invention comprises, as its main component, an elongated rectangular tray 1, attachable to the floor 3 of an automobile body 5 beneath said floor and one door 7 of the automobile and also one chassis frame side beam 9 of the automobile, for endwise advance horizontally out of an opening 11 in one side 13 of the automobile body 5 into projected exposed position, for use, and for retraction under the floor into concealed out-of-the-way position when not in use. For this purpose, the tray 1 is slidably mounted in laterally spaced front and rear U-shaped guide bars 15, 16 depending from a rectangular attaching plate 17 transversely of said plate. The plate 17 is suspended from the floor 3 beneath the door 7 and the aforesaid beam 9 by bolts 19 at the corners of the plate having nuts 20 thereon and spacing sleeves 21 on said bolts 19 between the floor 3 and said plate. The front guide bar 15 is terminally secured to the attaching plate 17 by some of the bolts 19 and nuts 20, whereas, the rear guide bar 16 may be suitably secured to said plate 17 by welding, not shown.

The tray 1 comprises a bottom 23, sides 25 and a front end plate extending upwardly above said sides 25 and forming a shoe scraper plate 27 which, when the tray 1 is retracted, seats against the aforesaid side 13 of the body 5. A shoe brush member 29 with bristles uppermost is fixed in one side of the tray 1 and one front corner thereof to the bottom 23, in any suitable manner, and opposite an elongated front, rectangular opening 30 in the bottom 23 of the tray 1. The opening 30 provides for discharging mud, snow, dust or the like out of the tray 1 and together with the scraper plate 27 and brush member 29 are readily accessible for use when the tray 1 is advanced and projected out of the body 5.

The tray 1 is advanced and retracted by means of a motor drive comprising the following. A reversible electric motor 33 is suitably fixed on top of the attaching plate 17 with its armature shaft 35 depending vertically through said plate 17 perpendicular thereto, and journaled in the rear guide bar 16. The armature shaft 35 is provided with a terminal horizontal gear pinion 37 fast thereon. The gear pinion 37 extends into and rotates in a longitudinal slot 39 in the bottom 23 of the tray 1 in the rear of the opening 30. Rack teeth 41 are provided on the bottom 23 of the tray 1 at one side of the slot 39 and with which the gear pinion 37 meshes to advance and retract the tray 1 in response to operation of the motor 33 in opposite directions respectively.

A pair of spring loaded limit switches 43, 45 are provided at one side 25 of the tray 1 for opening a motor circuit, presently described, to disable the motor 33 in the fully advanced and retracted positions of the tray 1, and a pair of stop lugs 47, 49 are provided on said side of the tray for operatively engaging said limit switches 43, 45 respectively, in response to advance and retraction of the tray. Preferably the switches 43, 45 are embodied in a switch box 42 attached, as shown, to the plate 17.

As shown in Figure 6, the motor 33 may be operatively connected to the ignition battery 51 of the automobile by a circuit controlled primarily by the conventional double throw, double pole switch 53 engageable alternately with either of two pairs 55, 57 of contacts to reverse the motor 33 for operation to advance and retract the tray 1, the battery 51 being connected at opposite sides thereof by leads 59, 61 to opposite sides of the switch 53 and the motor 33 being connected at opposite sides thereof to one pair of the contacts 55 by leads 63, 67 and also being connected at the opposite side thereof by leads 69, 71 to the other pair of contacts 57 with the limit switches 43, 45 interposed in the leads 63, 71. The switch 53 is preferably mounted on the steering column, not shown, of the automobile.

Referring now to the operation of the invention, the tray 1 is, of course, normally retracted into the full line position shown in Figures 2 and 4, the limit switches 43, 45 are normally closed and the switch 53, for safety purposes, should be in a neutral position. To advance and project the tray 1, for use, the switch 53 is thrown to engage the pair of contacts 55, as shown in Figure 6. The current then flows from one side of the battery 51 over lead 61 through switch 53, one contact 55, lead 63 and limit switch 43 to one side of the motor 33 and back to the other side of the battery 51 through lead 67, limit switch 45, the other of the contacts 55, switch 53 and lead 59 until stop lug 47 engages and opens limit switch 43. Thus the tray 1 is fully projected for use in the manner previously described.

To retract the tray 1 into hidden out-of-the-way position under the floor 3, the switch 53 is thrown to engage the pair of contacts 57 whereupon, the current will flow from the other side of the battery 51 through lead 59, one contact 57, lead 71, to one side of the motor 33 and from the other side of the motor 33 through lead 69, switch 45, to the other contact 57 and through switch 53 and lead 59 back to battery 51 until the stop lug 47 engages and opens limit switch 45 to disable the motor 33 in the fully retracted position of the tray 1.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the invention as claimed.

What is claimed as new is as follows:

1. A shoe cleaning device comprising an elongated rectangular tray having a front end provided with a shoe brush therein, a bottom having a longitudinal slot therein in the rear of said brush, and a toothed rack extending along one side of the slot, means for attaching said tray to an automobile body floor beneath said floor for sliding advance and retraction outwardly and inwardly of one side of an automobile body to expose and conceal the front end of the tray and said brush, said means comprising a plate overlying said tray and attachable to an automobile floor, U-shaped guide bars on said plate underlying and extending across the bottom of the tray in transverse supporting relation to said tray, a reversible electric motor for advancing and retracting said tray mounted on top of said plate and having an armature shaft depending through said plate into said slot and provided with a gear pinion thereon meshing with said rack, an electric circuit for energizing said motor, and means for opening said circuit in response to advance and retraction of the tray.

2. The combination of claim 1, said armature shaft being journaled in one of said guide bars.

3. The combination of claim 1, said toothed rack being formed on said bottom.

4. The combination of claim 1, said armature shaft being perpendicular to the bottom of the tray to dispose said gear pinion coplanar with said rack.

5. The combination of claim 1, said toothed rack being formed on said bottom within said slot, said armature shaft being journaled in one of said guide bars and being perpendicular to said bottom to dispose said gear pinion coplanar with said rack.

6. The combination of claim 1, including means rising from said plate for attaching the plate to an automobile floor in suspended spaced relation thereto to accommodate said motor between said plate and an automobile floor.

7. The combination of claim 6, said last named means including upright spacer sleeves on said plate.

References Cited in the file of this patent

UNITED STATES PATENTS

| | | |
|---|---|---|
| 1,670,867 | Paskal | May 22, 1928 |
| 2,797,104 | Drobney | June 25, 1957 |